Aug. 24, 1937. W. W. CONE 2,091,131
MASSAGING DEVICE
Filed Oct. 7, 1935
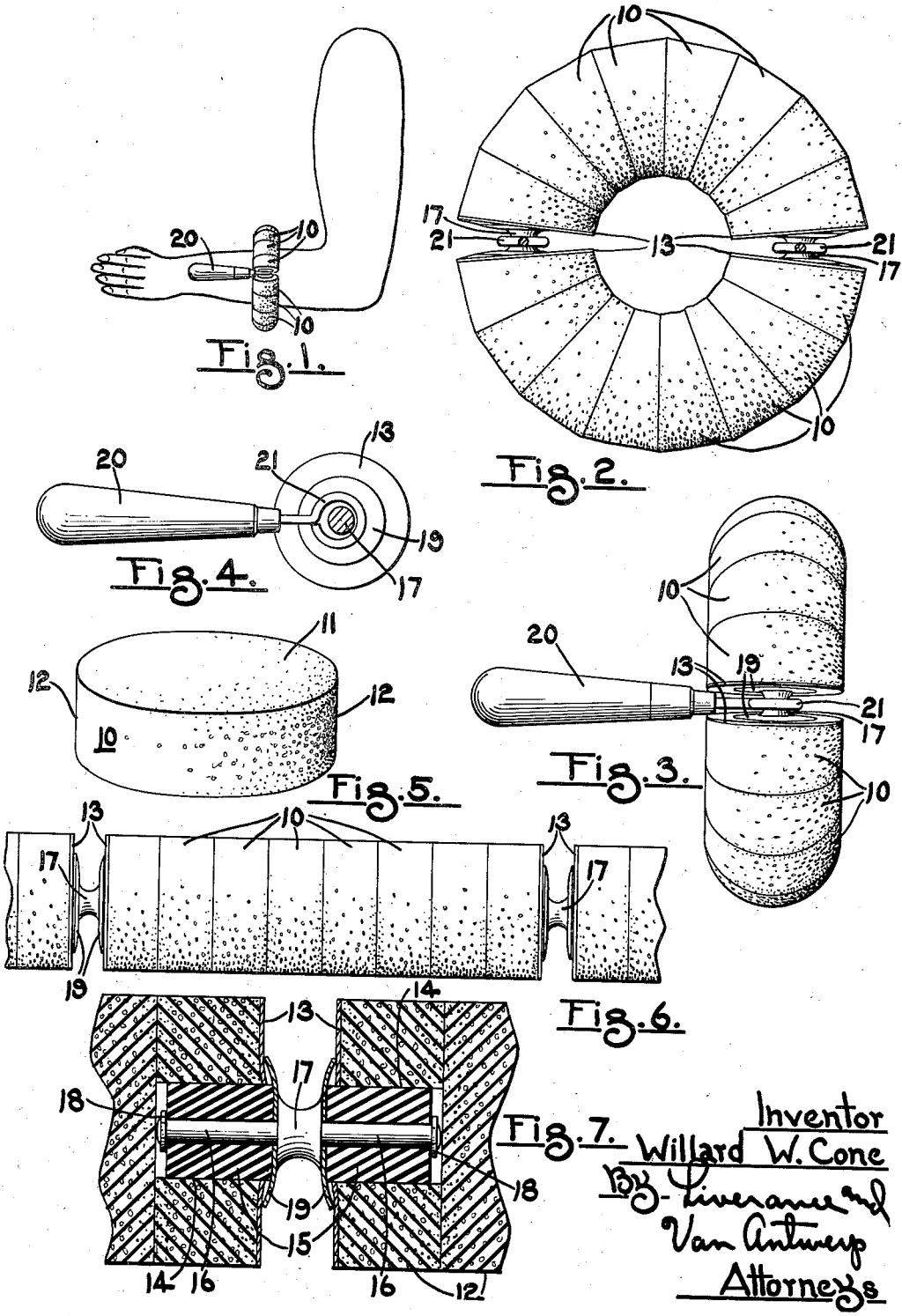

Patented Aug. 24, 1937

2,091,131

UNITED STATES PATENT OFFICE 2,091,131

MASSAGING DEVICE

Willard W. Cone, Muskegon, Mich.

Application October 7, 1935, Serial No. 43,823

4 Claims. (Cl. 128—57)

My invention relates generally to a massaging device and more particularly to a soft roller construction of annular shape which completely encircles the member which is being treated.

My construction is somewhat similar to the device shown in the Rieth U. S. Patent No. 1,757,060, granted May 6, 1930, but is improved over the Rieth construction in several particulars.

One of the main features of my invention resides in its annular shape whereby the entire peripheral area of the member being treated can be treated simultaneously. This is very desirable as will be understood by those skilled in this art.

Another feature and advantage of my construction resides in the circumferentially spaced stiffening ribs whereby any collapsing of the appliance is prevented.

Hand in hand with the advantage just recited is the advantage of individually forming the disks from a flat sheet of sponge rubber of the desired thickness whereby the opposite flat surfaces have a reinforcing skin thereon, which skin has sufficient rigidity to form the aforesaid stiffening means. Moreover, the skin is more or less impervious to moisture.

Another advantage resides in the particular attachment of the handle members whereby the device can be readily used.

Yet another advantage is the manner of forming the cylindrical surfaces of the several disks whereby these surfaces will be relatively soft and porous so as to massage and knead the body of the patient in a gentle yet efficient manner. Also, these porous surfaces will receive and temporarily absorb alcohol or the like whereby the device may be very advantageously used during an alcohol rub. The porosity of the rubber prevents rapid evaporation of the alcohol but permits a gradual feeding of the alcohol to the surface of the rubber roller and consequently to the body of the patient.

Another advantage of my construction lies in the means for holding the slightly spaced apart portions of the roller in fixed relationship whereby expansion of the same circumferentially will occur equally and proportionately along its entire length.

Also, the use of disks stacked and glued together provides a roller having the desired variable characteristics of porosity, density and compressibility.

These and other objects of my invention as may hereinafter appear will be best understood from a description of the accompanying drawing which illustrates one embodiment thereof.

My device can be made in various sizes as desired.

In the drawing:

Fig. 1 illustrates my invention as applied to a patient's forearm.

Fig. 2 is a side view of my invention.

Fig. 3 is an edge view, this view taken through the device adjacent one of its handles.

Fig. 4 is a sectional view through the handle bearing.

Fig. 5 is a perspective view showing one of the sponge rubber disks.

Fig. 6 illustrates my massaging device before being bent to annular form.

Fig. 7 is an enlarged sectional view showing the details of the handle attachment.

Like numerals refer to like parts in the several views.

Referring to Fig. 5, numeral 10 indicates a sponge rubber disk which has what is called a "skin" formed upon its flat faces as indicated by reference numeral 11. This skin is relatively heavy and provides a stiffening and reinforcing means for the disk. Moreover it is somewhat impervious to water. The outer cylindrical face, which is designated by numeral 12, is of open porous construction inasmuch as it has been cut to form. The porosity of the disk is greater near its middle and gradually decreases towards its ends.

The disk 10, see Fig. 6, are fastened together as by gluing whereby a cylindrical element of the desired length is formed.

Referring to Fig. 7, two of the disks 10 may be spaced apart and faced with rubber sheeting 13. These particular disks are axially recessed at 14 to receive a hard rubber bushing 15 cemented thereto. A shaft 16, having a bearing member 17, extends through the bushings 15 and is held in place by washers 18. Disks 19, curved as shown, are located between the cores 15 and the bearing 17. Each handle 20, see Figs. 3 and 4, has a ring 21 formed at its end. This end 21 encircles the bearing 17 and thus a rotatable connection is formed.

The straight assembly shown in Fig. 6 is undistorted and each sponge rubber disk 10 is located in a symmetrical flat shape. To complete the device, the cylindrical element is bent to annular form, see Figs. 1 and 2, and the free ends fastened together. Thus a construction, having the property of rotation about an annular axis, is obtained.

The device may be made of any desired length whereby it is suitable for encircling the body or any member thereof.

In use, the operator grasps the handles 20 and by pushing or pulling thereof causes movement of the massaging appliance along the member which is being treated. The cylindrical element, formed by the disks 10, during this manipulation, roll along the member being treated and do not slide and thus their use is very agreeable to the patient. The inner contacting portions of the massaging appliance press against the flesh of the patient and compress it, this action occurring completely around the particular member which is treated whereby the desired stroking thereof may be had.

As the diameter of the encircled member increases or decreases, the annular sponge rubber roll similarly changes without any circumferential sliding movement and thus any tendency toward pinching of the patient's skin is eliminated.

It is understood that my invention is not limited to the specific embodiment shown and that various deviations may be made therefrom without departing from the spirit and scope of the appended claims.

I claim:

1. A massaging device formed of sponge rubber disks having skin on their flat opposed surfaces, said surfaces being placed and fastened together so as to form a cylindrical body.

2. A device of the class described, comprising, an elongated roll in the form of a series of disks having their flat faces fastened together, said faces having the characteristic of minimizing passage of fluid, such as water, therethrough.

3. A massaging roll of the class described comprising, a plurality of sections, each section consisting of a plurality of disks, each of said disks being formed of sponge rubber, each disk having parallel faces when in unstressed condition, said faces being attached to one another to form the sections, revolvable means connecting adjacent ends of the sections to hold them in annular relationship and handle means fastened to each set of said revolvable means.

4. A massage roll of the class described comprising, a plurality of sections, each of said sections being formed principally of sponge rubber, the sum of said sections extending through substantially 360°, the respective ends of the said plurality of sections being in closely positioned relationship, and means including an intermediate bearing surface fastened to said respective ends, whereby relative rotation between said respective ends is prevented, and handle means cooperating with each of said bearing surfaces as described.

WILLARD W. CONE.